United States Patent
Swift (10) Patent No.: US 10,960,830 B2
(45) Date of Patent: Mar. 30, 2021

(54) METHOD OF APPLYING AND USING VISCOUS LIQUID RUBBER COMPOSITION

(71) Applicant: Swift IP, LLC, Weston, FL (US)

(72) Inventor: Philip Swift, Weston, FL (US)

(73) Assignee: Swift IP, LLC, Weston, FL (US)

( * ) Notice: Subject to any disclaimer, the term of this patent is extended or adjusted under 35 U.S.C. 154(b) by 28 days.

(21) Appl. No.: 16/364,701

(22) Filed: Mar. 26, 2019

(65) Prior Publication Data

US 2019/0217332 A1 Jul. 18, 2019

Related U.S. Application Data

(62) Division of application No. 14/980,941, filed on Dec. 28, 2015, now abandoned.

(51) Int. Cl.
| | | |
|---|---|---|
| *B05D 1/28* | (2006.01) | |
| *B60R 13/08* | (2006.01) | |
| *D06N 7/00* | (2006.01) | |
| *B05D 5/00* | (2006.01) | |
| *A63C 17/01* | (2006.01) | |

(52) U.S. Cl.
CPC .............. *B60R 13/08* (2013.01); *B05D 5/00* (2013.01); *D06N 7/0073* (2013.01); *A63C 17/01* (2013.01); *A63C 2203/42* (2013.01)

(58) Field of Classification Search
CPC .................................. B05D 1/28; B05D 1/30
See application file for complete search history.

(56) References Cited

U.S. PATENT DOCUMENTS

| | | |
|---|---|---|
| 3,189,576 A | 6/1965 | Sweet |
| 3,607,972 A | 9/1971 | Kiles et al. |
| 3,609,178 A | 9/1971 | Thomas |
| 3,962,160 A | 6/1976 | Beers et al. |
| 4,020,029 A | 4/1977 | Gorbunow |
| 4,329,247 A | 5/1982 | Palmer |
| 4,536,454 A | 8/1985 | Haasl |
| 4,555,560 A | 11/1985 | Saruyama et al. |
| 4,745,139 A | 5/1988 | Haasl et al. |
| 5,192,608 A | 3/1993 | Haasl et al. |
| 5,256,716 A | 10/1993 | Haasl et al. |
| 5,314,940 A | 5/1994 | Stone |
| 5,733,960 A | 3/1998 | Altes et al. |

(Continued)

FOREIGN PATENT DOCUMENTS

| | | |
|---|---|---|
| EP | 0704494 A2 | 4/1996 |
| EP | 0713902 A2 | 5/1996 |
| GB | 1089590 A | 11/1967 |
| WO | 9532245 A1 | 11/1995 |

OTHER PUBLICATIONS

Ames Research Elastomeric Pain & Waterproof Coating Website: https://www.amesresearch.com/basement-foundations/ google dated as available on Nov. 15, 2009 (Year: 2009).*

(Continued)

*Primary Examiner* — Nathan H Empie
(74) *Attorney, Agent, or Firm* — Banner & Witcoff, Ltd.

(57) ABSTRACT

Viscous liquid rubber compositions are applied to articles by brushing, rolling, pouring, or dipping to repair leaks or to modify the appearance and/or physical properties of the article, such as water-permeability, thermal insulation, shock resistance, vibration resistance, electrical insulation, and the like.

1 Claim, 8 Drawing Sheets

(56) References Cited

U.S. PATENT DOCUMENTS

| | | | |
|---|---|---|---|
| 2005/0285515 A1* | 12/2005 | Vlaskin | H05B 33/145 313/506 |
| 2007/0015893 A1 | 1/2007 | Hakuta et al. | |
| 2007/0237965 A1 | 10/2007 | Rosthauser | |
| 2009/0250386 A1* | 10/2009 | Mayrand | C02F 3/082 210/151 |
| 2010/0233146 A1 | 9/2010 | McDaniel | |
| 2011/0006028 A1 | 1/2011 | Caldwell | |
| 2011/0105647 A1 | 5/2011 | Kuster-Kosmoski et al. | |
| 2014/0205804 A1 | 7/2014 | Jones et al. | |
| 2015/0005424 A1 | 1/2015 | Jones et al. | |

OTHER PUBLICATIONS

This Old House website: https://www.thisoldhouse.com/painting/21019359/screening-paint google dated as available on Aug. 1, 2007 (Year: 2007).*

Flex Seal Facebook page, https://www.facebook.com/getflexseal.

250 HS Solvent-Free Coating, Mixture, Safety Data Sheet, Instacoat Premium Products, Feb. 2015, 7 pages, www.instacoat.com.

250 HS Silicone 2012, Instacoat Premium Products, V.O.C. Compliant, 2 pages.

250 HS Silicone, 5 gal, Instacoat Premium Products, one page.

Web capture of https://www.cannoninstrument.com/en/content/viscosity-and-rheology-classroom on Nov. 17, 2017.

"Ames' Block & Wall Liquid Rubber" Physical Performance Properties Data Sheet published on Apr. 2, 2009.

Web article "Steaming With Plastic: Is it safe" from http://www.blueridgeoutdoors.com/go-outside/steaming-with-plastic-is-it-safe/ dated Oct. 18, 2011.

Webster's II new Riverside University dictionary © 1984 Houghton Mifflin Co., Boston MA—definition of pour (ing).

Plasti Dip—Multipurpose Rubber Coating brochure / technical data sheet from Jan. 22, 2002, Performix Brand, 2 pages.

Doesitreallywork website: http://web.archive.org/web/20120405221422/http://doesitreallywork.org/flex-seal (as it axisted on Apr. 5, 2012).

Rubberizeit!™ website: https://web.archive.org/web/20131218184253/http://www.rubberizeit.com/ (as it existed on Dec. 18, 2013).

* cited by examiner

METHOD OF APPLYING AND USING VISCOUS LIQUID RUBBER COMPOSITION

This is a division of U.S. application Ser. No. 14/980,941, filed Dec. 28, 2015, the entire subject matter of which is incorporated herein by reference.

BACKGROUND

Aerosol-propelled rubber compositions, such as FLEX SEAL® sold by Swift Response LLC, have been used by consumers for waterproofing and repairing household articles. It would be desirable to develop alternative techniques for repairing or modifying household articles, sporting equipment, motor vehicles, appliances, portions of homes and associated structures, and the like, to improve the appearance and/or performance of the article while deferring the expense of replacing the article. It would be particularly desirable to develop techniques which are safe and easy-to-use for consumers.

SUMMARY

Aspects of the invention involve applying viscous liquid rubber compositions to articles by brushing, rolling, pouring, or dipping, to repair leaks or to modify one or more physical properties of the article, such as water-resistance, thermal insulation, shock resistance, vibration resistance, electrical insulation, grip enhancement, strength and flexibility properties, and the like. Other aspects involve applying viscous liquid rubber compositions to articles for aesthetic purposes.

BRIEF DESCRIPTION OF THE DRAWINGS

A more complete understanding of the present invention and certain advantages thereof may be acquired by referring to the following detailed description in consideration with the accompanying drawings, in which.

DETAILED DESCRIPTION

Viscous liquid rubber compositions (sometimes referred to herein simply as "compositions") may be used in a variety of techniques involving repair or modification of various household items, hand tools, garden tools, cooking or eating utensils, sports equipment, automobiles, boats, air conditioners, furnaces, and so on. In general, the compositions may be applied using a variety of techniques such as brushing, rolling, dipping, pouring, or coating in other desired techniques. Often a conventional paint applicator such as a brush or roller may be used. More specific techniques involving the repair or modification of various objects also are disclosed herein.

In some examples, compositions are applied to articles for purposes of waterproofing, including repairing holes or leaks in the article, or modifying an article to make it waterproof by covering preformed holes or by adding a moisture-impermeable layer to the article or portion thereof. The compositions may be poured into cracks in concrete, such as cracks present along a garage floor or in a basement foundation. In one example, a crack is formed in a concrete block by milling or other suitable technique, and a quantity of the composition is poured into the crack to fill the opening. The composition may be poured directly into cracks and holes to penetrate into deep hard-to-reach areas and create a waterproof seal. The compositions also may be applied with a paint roller onto concrete walls or floors to create a waterproof layer.

In other examples, compositions are applied to articles for purposes of changing the physical properties and/or aesthetics of the article. For example, a layer may be applied to an article, or a portion thereof, to introduce properties such as thermal insulation, electrical insulation, shock resistance, vibration resistance, and the like. Once cured, the composition generally forms a durable, breathable, weatherproof barrier that is resistant to rain, snow, sun, wind, air moisture, UV degradation, and natural weathering over a wide temperature range. Aesthetic modifications may include, for example, altering the color and/or texture of an article, and/or applying indicia, stripes, logos, or the like to an article or portion thereof.

The compositions typically include one or more synthetic rubber components and generally are formulated to be viscous though in the liquid phase at room temperature. The term "viscous liquid rubber composition" is used herein to refer to a non-aerosol based rubber composition that has relatively high viscosity. For example, when a quantity of the composition is poured into a kitchen strainer or onto a horizontally-oriented window screen, the composition normally remains adhered to the strainer or screen without any dripping. By way of non-limiting example, viscosity may range from about 130 ku to about 170 ku, from about 140 ku to about 160 ku, or from about 150 ku to 155 ku; and specific gravity may range from about 1.2 to 1.4 or from about 1.25 to about 1.35.

In one aspect, a method of visually determining the relative viscosity of a liquid rubber composition comprises providing a horizontally oriented screen, such as a conventional window screen or a wire screen of similar mesh size. A reference liquid, such as latex paint, is poured onto a first portion of the screen, and a liquid rubber composition is poured onto a second portion of the screen (or onto a second screen or similar construction). In one example, a portion of the reference liquid poured onto the screen drips through the screen, but the liquid rubber composition poured onto the screen does not drip through the screen. This technique may be used to demonstrate that the liquid rubber composition has a viscosity higher than that of the latex paint.

Non-limiting examples of suitable synthetic rubbers include ethylene propylene diene monomer (EPDM) rubber, ethylene propylene rubber, styrene-butadiene rubber (SBR), rubbers prepared from isoprene (2-methyl-1,3-butadiene), chloroprene (2-chloro-1,3-butadiene), or from isobutylene with a small percentage of isoprene for crosslinking, and polyether-based silane-terminated polymers. The compositions typically include a number of other components, such as mineral fillers, fluid carriers, crosslinking agents, catalysts, and the like in suitable proportions that will be apparent to persons skilled in the art with the aid of no more than routine experimentation. The compositions may contain a solvent that volatilizes after application, although in view of current environmental regulations it generally is desirable to employ solvent-less compositions which may cure, for example, by crosslinking when exposed to the environment.

The composition may be provided in a ready-to-use state, e.g., such that no mixing of components is needed. In some aspects, the composition may be brushed, sprayed, rolled, poured, or dipped right from the can. The composition generally has relatively high viscosity that allows for single or multiple coat application and resists running, dripping, and sagging.

The compositions may be formulated in a variety of colors tailored to particular applications. For example, compositions may be clear, white, off-white, black, gray, blue, green, red, almond, brown, silver, yellow, terra cotta, or other suitable colors. The selection of appropriate pigment(s) or other colorant(s) needed to achieve a desired color will be apparent to persons skilled in the art.

Figure 1A:
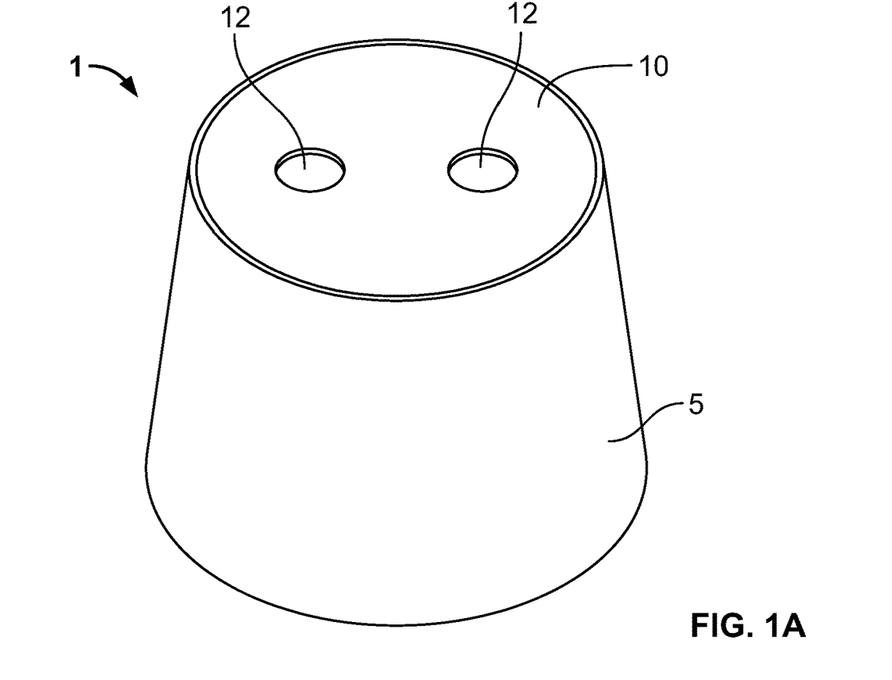
FIGS. 1A-1D schematically illustrate filling weep holes in a flower pot using a viscous liquid rubber composition.

The compositions may be used to fill holes in articles such as containers, such as to repair leaks, or to modify the structure of the article. For example, with reference to FIG. 1A, a ceramic or plastic flower pot 1 designed for outdoor use often has a solid sidewall 5 and a bottom 10 containing one or more weep holes 12 to permit drainage of excess water. If such flower pots 1 are to be used indoors, it may be desirable to fill the weep holes 12 along the bottom 10 to prevent dirt-infused water from escaping from the pot and potentially causing damage to floors, carpet, furniture, etc. The compositions disclosed herein may be used to fill the weep holes 12 along the bottom 10 to create a watertight container that is more suitable for indoor use.

Figure 1B:
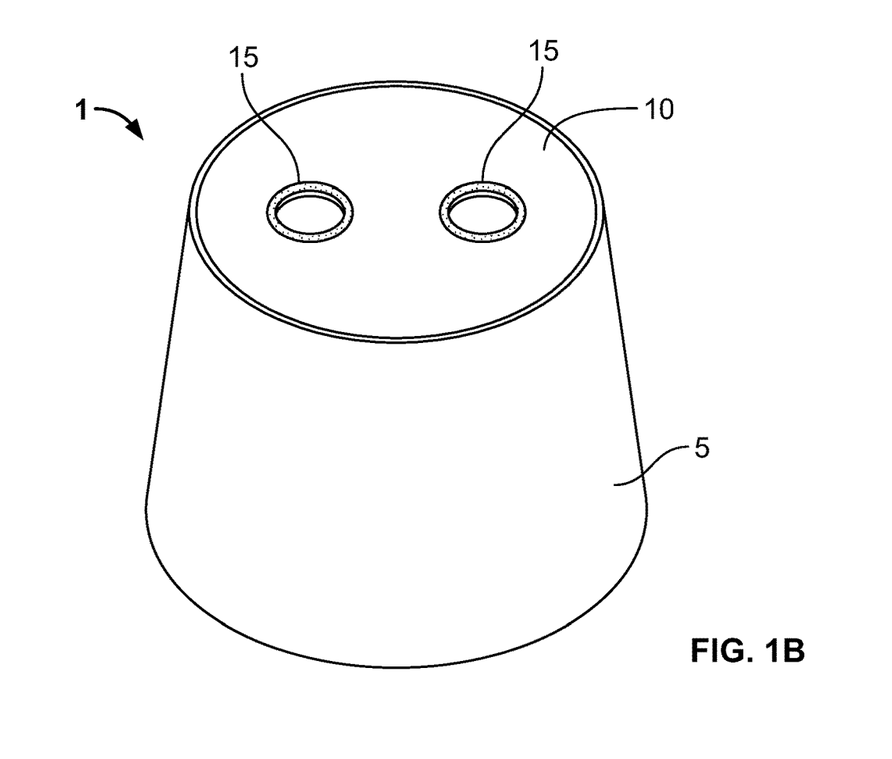
Figure 1C:
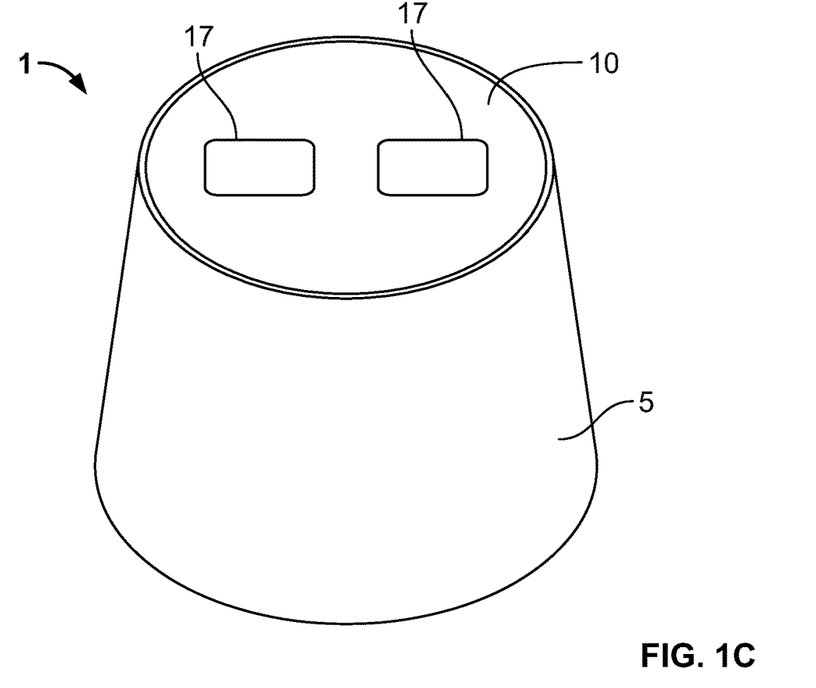
Figure 1D:
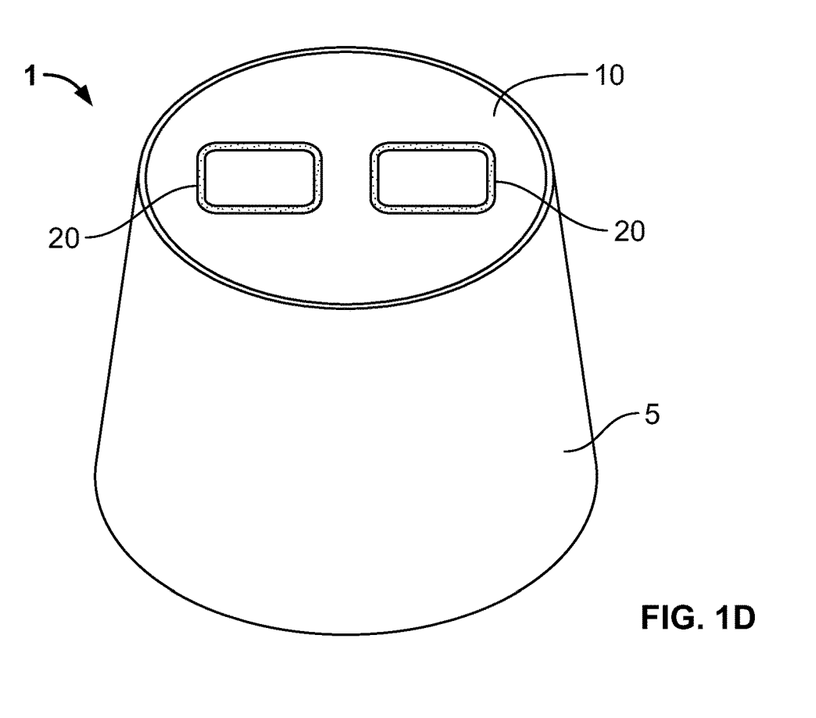

In one technique that may be used to fill a larger hole present in a flower pot or other container, for example, with reference to FIGS. 1B and 1C, a first layer 15 of the composition is applied to the surfaces of the container immediately adjacent to the holes 12. This application step can be accomplished by brushing, rolling, or pouring the composition to the desired area. A patch 17 is then positioned over the first layer 15 so as to cover the holes 12. When the composition cures, the first layer functions 15 as an adhesive between the bottom surface of the container 10 and the patch 17. As shown in FIG. 1D, a second layer 20 of the composition may be applied around the periphery of the patch 17, if needed, to provide a watertight seal at the intersection of the patch 17 and the bottom surface 10 of the container. This application step can be accomplished by brushing, rolling, or pouring the composition to the desired area, and can be started before or after the first layer 15 cures.

If the patch 17 is moisture-permeable, such as cloth, woven or nonwoven fabric, etc., a second layer 20 of the composition may be applied over the entire outer surface of the patch 17 so that the resulting bottom surface 10 of the container is watertight. If, on the other hand, a moisture-impermeable material is used, such as plastic or the like, it may not be necessary to apply a second layer 20, or at least not necessary to apply the second layer 20 over the entire outer surface of the patch 17. In the case where a moisture-impermeable material is used, the patch 17 may be applied over the first layer 15 of the composition, as described above, or alternatively the patch 17 may be applied first over the holes 12 following by applying the composition around the edges of the patch 17 to secure it to the container in a watertight fashion. For applications involving the filling of smaller holes or the repair of cracks in a container or other object, a patch often is not needed. This application step can be accomplished by brushing, rolling, or pouring the composition to the desired area. In such situations, one or more coats of the composition may be applied, as needed, directly to the object to fill the hole, crack, etc. When multiple coats are used, the composition normally should be allowed to cure between coats. In another example, the composition may be poured onto the interior surfaces of a flower pot and allowed to cure to form a waterproof liner.

Figure 2A:
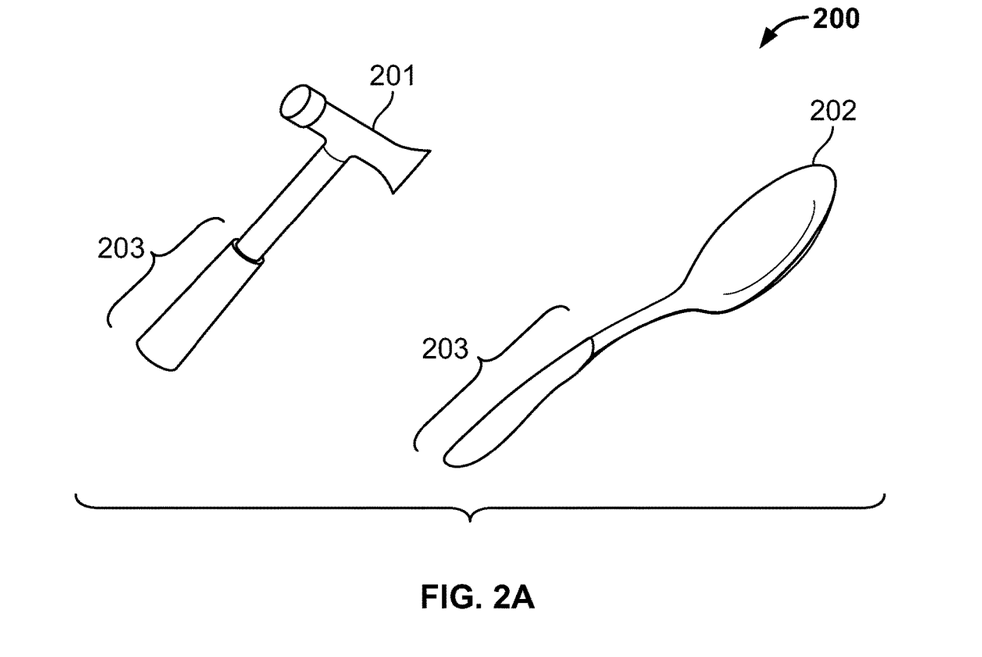
FIG. 2A-2B schematically illustrate applying a viscous liquid rubber composition to a tool or utensil.
Figure 2B:
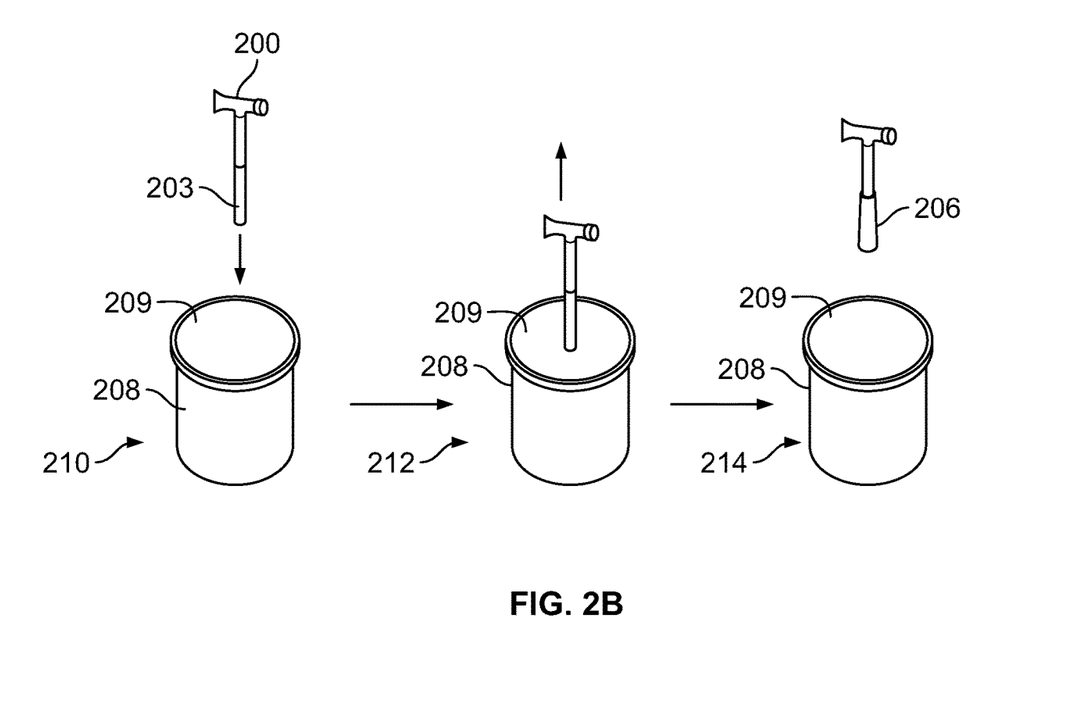

In another aspect, with reference to FIGS. 2A-2B, the composition may be applied to at least a grip portion 203 of a hand tool 200 (e.g., hammer 201, screw driver, saw, pliers, wrench, shovel, wire cutter, hoe, rake, etc.) or eating or cooking utensil (e.g., ladle 202, spatula, tongs, large wooden spoon, fork, knife, soup spoon, etc.). Such an application creates an improved gripping surface. In addition to the improved gripping surface, it also enhances additional properties of the tool or utensil such as enhancing its strength, making it more heat resistant (which can be extremely beneficial for cooking utensils), increasing its electrical insulation properties (which can be extremely beneficial when working with tools useable on electrical wires or on power tools), and deadening vibrations which would otherwise be passed to the user. In one application technique, as shown in FIG. 2B, the handle portion 203 of tool and/or utensil is dipped into a container 208 of the liquid rubber composition 209 as shown in step 210. The tool and/or utensil is removed from the container 208 containing the liquid rubber composition 209 as shown in step 212 and the handle portion 203 is covered with a liquid rubber coating 206. The liquid rubber coating 206 is given time for the composition to cure. Once cured and dried, as described above as shown in step 214, the composition coated grip 206 may offer a number of advantages such as thermal insulation, shock resistance, vibration resistance, and/or electrical resistance. In an alternative method, the composition 209 can be painted onto the handle portion 203 of the tool 201 or utensil 202, e.g., by a paint brush or paint roller, and cured to provide a grip 206 having the desired properties.

Figure 3:
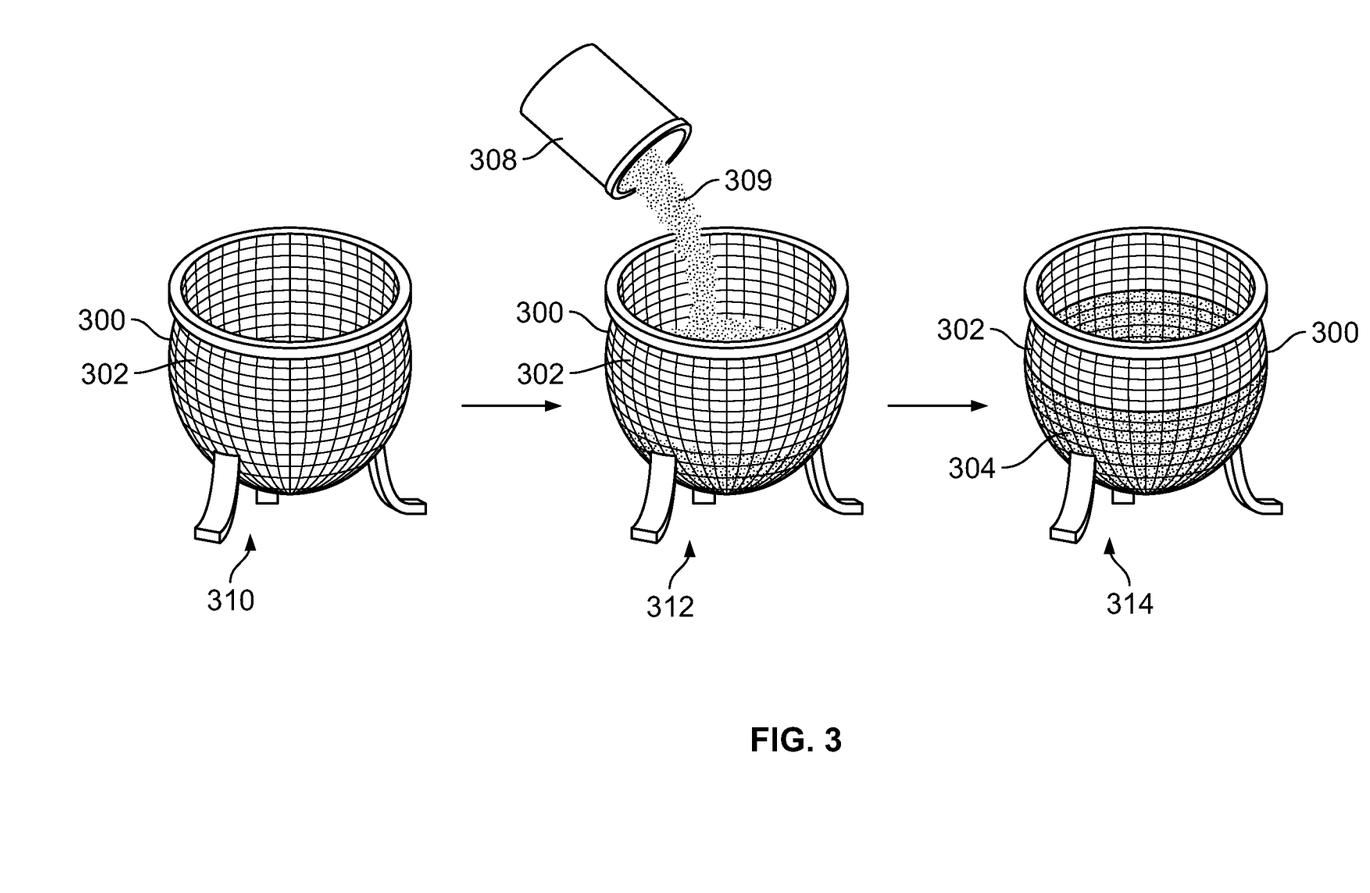
FIG. 3 schematically illustrates a process of applying a viscous liquid rubber composition to a strainer.

With reference to FIG. 3, the composition also may be applied to a strainer 300 as shown in step 310. This can serve to make a portion of the strainer water impermeable if only a portion of the strainer is coated with the composition; or it can make it entirely water impermeable if the entire mesh portion 302 of the strainer is coated. This application step 312 can be accomplished by pouring the composition 309, from a container 308 for example, onto a target area of the mesh portion 302 of the strainer 300 and moving the container 308 (i.e., moving the target area to which the composition is applied) until the all or the desired portion 304 of the mesh strainer 300 is coated. Once cured in step 314, the coated portion 304 is water-impermeable. In one embodiment, the liquid rubber composition is sufficiently viscous and openings in the strainer are relatively small such that no liquid passes through the strainer. In an alternative application method, the liquid composition can be painted onto the mesh portion 302 of the strainer 300, e.g., by a paint brush or paint roller, and cured to create the water impermeable region 304. These methods can also be used to repair or patch a strainer where a portion of the mesh is damaged by coating the damaged portion with the liquid rubber composition, i.e., by making the damaged portion the target portion.

Figure 4:
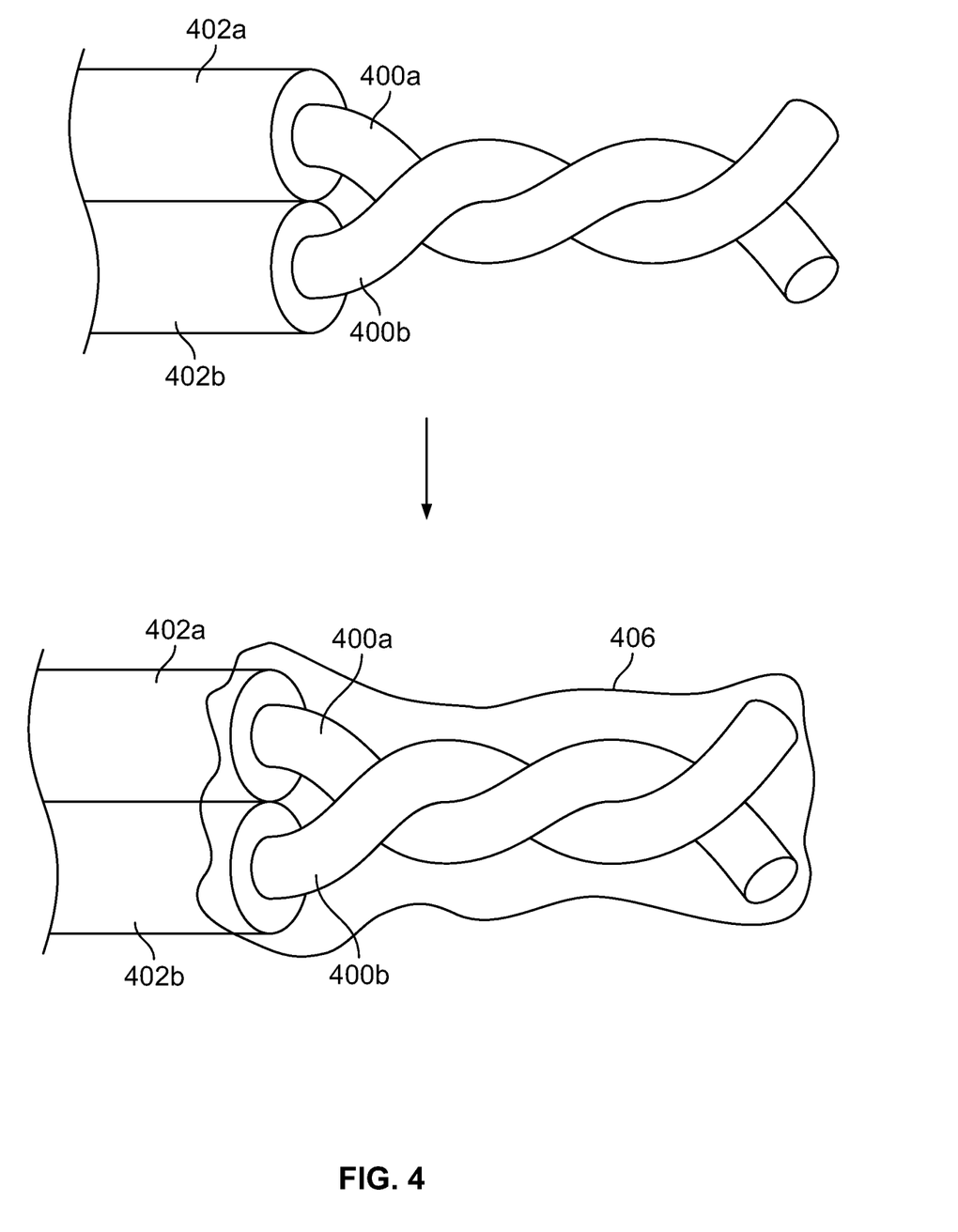
FIG. 4 schematically illustrates a process of applying a viscous liquid rubber composition to spliced electrical wires.

In yet another aspect, with reference to FIG. 4, the composition may be applied over exposed electrical wires

400a, 400b to create an electrically insulating layer. In a common household electrical wiring repair technique, loose electric wires are twisted together and the twisted wires are capped with a plastic cap. However, this technique is susceptible to the exposed wires potentially becoming a hazard and the possibility of the plastic cap falling off increasing the likelihood of a potential hazard. As an alternative to this oft-used method, and as seen in FIG. 4, after electrical wires 400a and 400b are spliced together by twisting, the composition may be applied to coat the exposed areas of the wires to form a protective, electrically insulating layer. This application step can be accomplished by brushing, rolling, or pouring the composition to the exposed twisted wires 400a and 400b, or the region with the twisted wires may be dipped into a container having the composition and withdrawn. Upon curing, the protective insulating layer 406 is formed. The end portions of the sheathes or cladding 402a and 402b of the respective wires 400a and 400b may be coated as well if desired. If desired, a clear liquid rubber composition may be used for this purpose, e.g., so that the junction of the wires 400a and 400b remains visible through the insulating layer 406. This enables the quality of the spliced wires to be visually inspected for integrity. Alternatively, a colored composition may be used, e.g., one which matches the color of the existing sheathes or cladding 402a and 402b, or otherwise provides color-coding as desired.

Figure 5A:
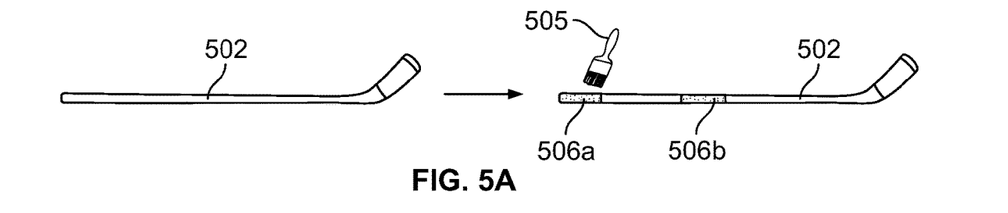
FIGS. 5A-5D schematically illustrate a process of applying a viscous liquid rubber composition to sporting goods.

In another aspect, as shown in FIGS. 5A-5D, the composition is applied to an article of sporting equipment with a handle or shaft such as a hockey stick, baseball bat, crochet mallet, golf club, or the like, to other sporting equipment such as a skateboard, or to an inflatable ball. In some examples, the composition is applied to grip portion(s) to improve gripping properties and/or provide thermal insulation, shock resistance, vibration resistance, etc. In other examples, the composition is applied to non-grip portion(s) of the article of sports equipment. For example, as shown in FIG. 5A, the composition 508 may be applied along the shaft of a hockey stick 502 for increasing gripping and tactile properties, for aesthetic purposes, and/or to modify the flex properties of the shaft, e.g., by increasing flexural stiffness. The composition may be applied by any desired technique, such as by painting with a brush 505 or roller or by dipping or pouring. Once applied, the composition is permitted to cure to form a single gripping region covering the majority of the shaft or separate gripping regions 506a and 506b. This technique results in providing enhanced gripping surfaces 506a and 506b where the player's hands typically grip the stick 502 without adding additional weight in the region therebetween. This technique may be used with either wooden or composite hockey sticks. In another example, not shown, the composition may be applied to the blade of the hockey stick 502 to provide vibration resistance and/or to modify the frictional properties of the blade.

Figure 5B:
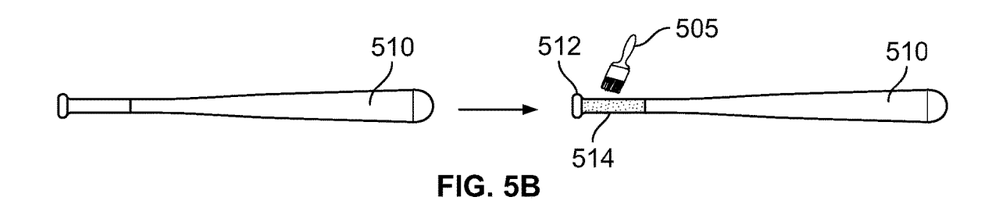

FIG. 5B shows the application of the viscous liquid rubber composition to a baseball bat 510. For example, as shown in FIG. 5B, the composition may be applied along the handle portion 514 of the baseball bat 510 for increasing gripping and tactile properties, for reducing vibrations that are transmitted back to the user, and/or for aesthetic purposes. The composition may be applied by any suitable technique, such as by painting with a brush 505 or roller or by dipping or pouring. Once applied, the liquid rubber composition is permitted to cure to form an enhanced gripping region 514. If a dipping process is used or if desired, the butt end 512 portion of the baseball bat 510 may be covered along with the base portion of the bat 510 proximate the butt end. This technique may be used, for example, with wooden, aluminum, or composite baseball bats.

Figure 5C:
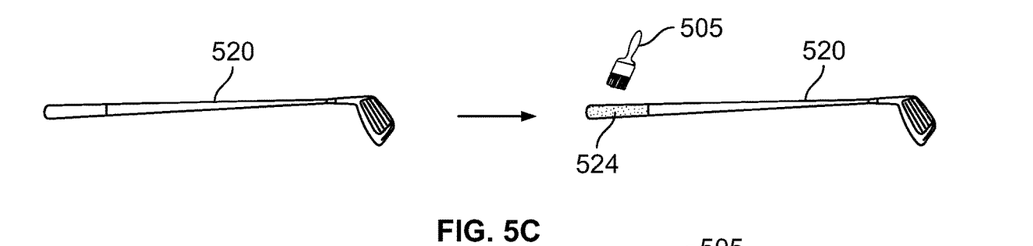

FIG. 5C shows the application of the viscous liquid rubber composition to a golf club 520. Grips on golf clubs have been known to rip or undesirably wear. The composition may be applied to the grip portion of a golf club, either directly to the shaft or over an existing grip, to provide an enhanced grip. For example, as shown in FIG. 5C, the composition may be applied to the grip portion 524 of the golf club 520 for increasing gripping and tactile properties, for reducing vibrations that are transmitted back to the golfer, and/or for aesthetic purposes. The composition may be applied by any desirable technique, such as by painting with a brush 505 or roller or by dipping or pouring. Once applied, the composition is permitted to cure to form the enhanced gripping region 524. Multiple coats of the liquid rubber composition may be applied, as desired, to increase the thickness of the grip 524.

Figure 5D:
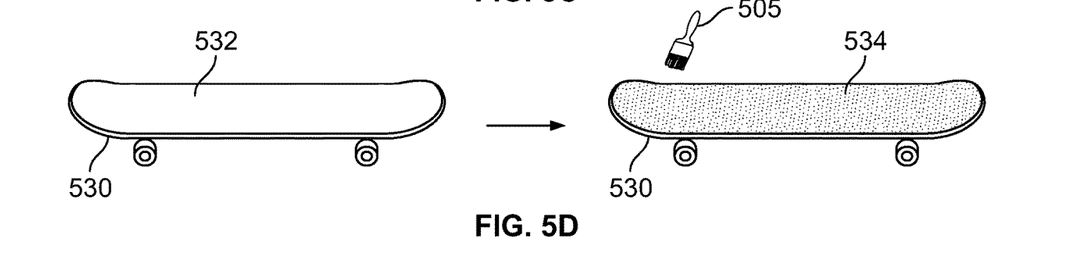

FIG. 5D shows the application of the viscous liquid rubber composition to a skateboard 530, and more specifically to the upper surface 532 of a skateboard 530. Skateboarders commonly tape sandpaper-like material to the upper surface of skateboards to enhance the grip between shoes and the skateboard while skating. However, the sandpaper-like texture adds to the wear of both the upper and the sole of the user's footwear. As shown in FIG. 5D, the composition may be applied to the upper surface 532 of the skateboard 530 for providing increasing gripping and tactile properties, and/or for aesthetic purposes. The rubber-coated upper surface 532 provides an enhanced grip that may have less of a negative impact on the wear of shoes. The composition may be applied by any desirable technique, such as by painting with a brush 505 or roller. Once applied, the liquid rubber composition is permitted to cure to form the enhanced gripping region 534 on the upper surface 532. In addition to providing an improved gripping surface, the cured composition may provide other benefits to the skateboard 530, such as increased strength, waterproofing, and reduced vibrations transmitted to the rider. If desired, the liquid rubber composition may also be applied to the lower surface and sides of the skateboard 530 to make the skateboard entirely waterproof and/or supplement the strengthening properties mentioned above.

Figure 6:
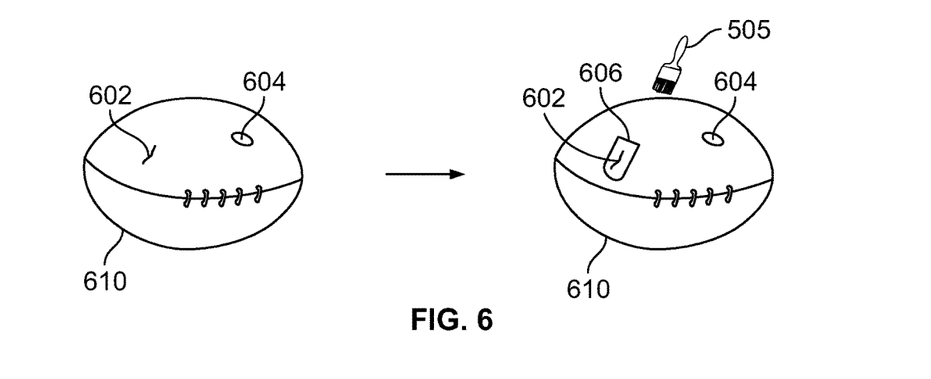
FIG. 6 schematically illustrates a process of applying a viscous liquid rubber composition to an inflatable ball.

FIG. 6 shows the application of the liquid rubber composition to an inflatable ball 610, such as a football, a rugby ball, a soccer ball, a volleyball, or an exercise ball, which has been damaged by a perforation or tear 602 and cannot fully hold air at the desired inflation pressure. The composition may be applied by any desirable technique, such as by painting the area 606 surrounding the perforation or tear 602 with a brush 505 or roller. Once applied, the liquid rubber composition is permitted to cure to patch the damaged area and form an air- and water impermeable coating that enables the ball to hold air at a desired pressure when inflated via nozzle hole 604.

The composition also may be applied to soles and/or other outer portions of athletic shoes, boots, etc. to provide waterproofing and/or modify physical properties thereof. For example, a portion or the entire outer surface of shoes or boots may be dipped into the composition, or the composition may be applied to the outer surface or portion thereof by brushing or rolling, to form a waterproof outer layer.

In yet another aspect, the composition is applied to machinery for purposes of noise reduction. For example, the composition may be applied to the base of a window air conditioning unit, water filtration system (e.g., for a pool or hot tub), air compressor, furnace, etc. to reduce noise resulting from vibration of machine components. Instead of (or possibly in addition to) applying the composition directly to the equipment, the composition may be applied to structure that supports the equipment, e.g., housing or the like, to reduce noise associated with vibration.

In other aspects, the composition may be applied to a wide variety of surfaces that are subject to high levels of wear-and-tear, including furniture, countertops, cabinets, hardwood floors, and the like. More generally, the compositions may be applied to surfaces that are subject to high levels of wear-and-tear as an alternative to polyurethane coatings that conventionally have been applied to such surfaces.

In other examples of household applications, the composition may be applied between tiles as a substitute for grout. For example, ceramic tiles may be prepared and placed over a floor or other surface to be tiled, and secured to the underlying structure using conventional techniques. After the tiles are in place, the spaces between the tiles may be filled with the composition by brushing, extruding through a caulk tube nozzle, or other suitable technique. In another example, the composition may be applied over existing grout to form a protective coating.

The composition also may be applied to exterior surfaces of automobiles, or other types of motor vehicles such as boats, to form a decorative layer, indicia, stripes, or the like. In one example, the composition is applied along the surfaces of the bed of a pickup truck to form a protective layer, thereby eliminating the need for a premolded bed liner. The composition also may be used to seal a car bumper, car floorboards, car speakers, etc. In other examples, the composition is applied to repair a leak in a soft top of a convertible automobile or a leak in an inflatable raft.

The composition may be applied to pipes and hoses, such as the ends of downspouts, gutters, PVC pipes, irrigation pipes, conduits, etc. to attach segments together in a watertight manner. In one example (not illustrated), an end portion of a downspout or PVC pipe is dipped into a can containing the viscous liquid rubber composition. The downspout or PVC pipe containing the liquid rubber composition is then inserted into a fitting or junction element, e.g., gutter fitting. After the composition cures, the downspout or PVC pipe is adhered to the fitting or junction element in a watertight manner.

The composition also may be applied to various fabrics such as an umbrella, tent, awning, or the like to increase waterproofing. In one example (not illustrated), the composition is rolled onto a metal roof and allowed to cure to form a waterproof coating.

Figure 7:
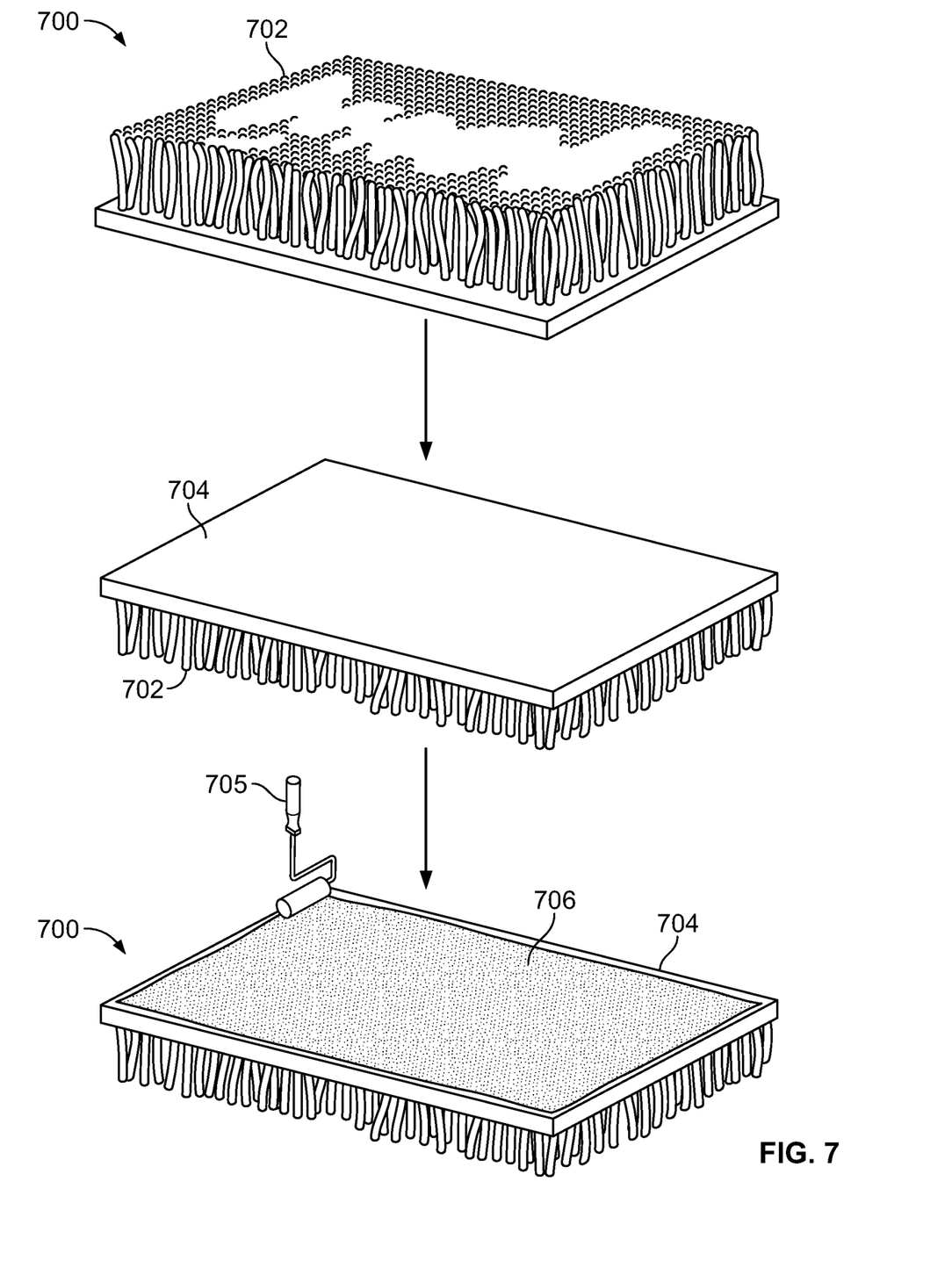
FIG. 7 schematically illustrates a process of applying a viscous liquid rubber composition to carpet.

In another aspect, as shown in FIG. 7, the composition is applied to carpet or an area rug 700 to create a non-slip surface. More specifically, the composition is applied to the undersurface 704 of the carpet, i.e., the surface opposite the walking surface 702. The composition may be applied by any desirable technique, such as by painting the underside 704 or portions thereof with a brush or a roller 705. Once applied, the liquid rubber composition is permitted to cure and the carpet 700 is placed in a desired location with gripping region(s) 706 providing a non-slip surface against the floor (not illustrated). The composition may provide other benefits as well, including improving sound insulation as well as wearing properties of the carpet or rug 700. In one approach, only selected portions 706, such as the corner regions, of the underside 704 are coated with the liquid rubber composition. In another approach as illustrated in FIG. 7, a large area 706 including the entire lower surface may be coated. Applying the composition to the entire undersurface of a carpet or rug, or at least a substantial portion thereof, also may avoid the need for a pad as is conventionally used.

The composition also may be used to create a waterproof liner for a pond, fish tank, or pool. For example, a pool or pond structure may be formed from a suitable material such as rocks, bricks, wood, concrete, or the like. If desired, the ground first may be excavated such that the pool or pond structure is partially or entirely in-ground. The composition then may be applied to the exposed surfaces of the pool or pond structure using any suitable technique such as rolling, brushing, or pouring. The composition is allowed to cure, and the pool or pond structure thereafter may be filled with water.

A clear composition may be applied to a newspaper, photo, document, etc. as a protective and transparent lamination to preserve the document. The composition may be applied to metal to prevent rust and corrosion. A clear composition also may be applied over glass for purposes of making the glass shatter-resistant.

Figure 8:
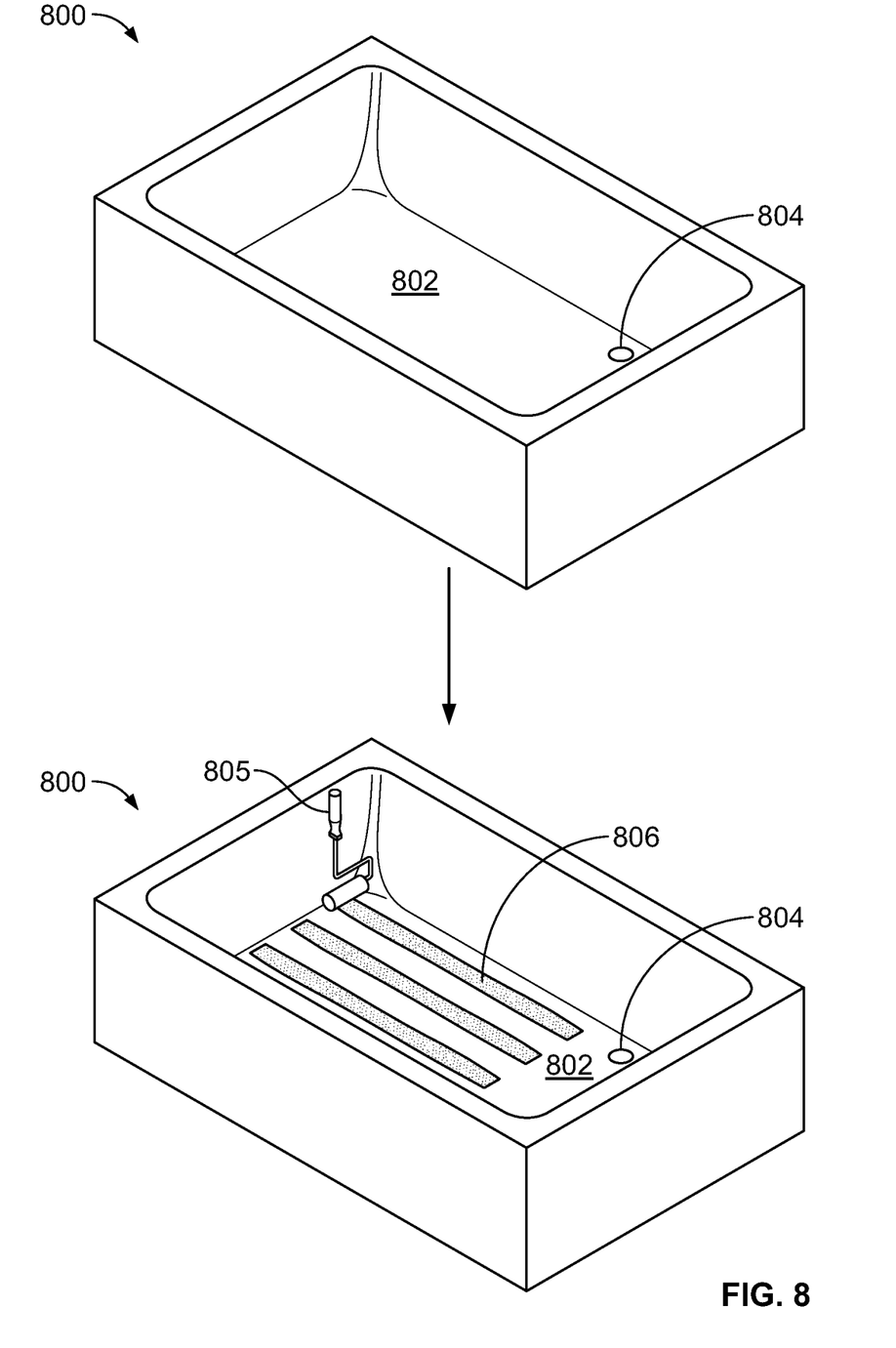
FIG. 8 schematically illustrates a process of applying a viscous liquid rubber composition to a shower or bathtub.

In another example, as shown in FIG. 8, a shower or bathtub 800 is coated with the composition to create a waterproof liner and/or to provide safety grip surfaces. More specifically, with reference to FIG. 8, the bottom surface 802 of a shower or tub 800 where a user stands and which normally includes a drain 804, commonly creates a dangerous slip-and-fall hazard due to being slippery when wet. The composition may be applied by any desirable technique, such as by coating the bottom surface 802 or portions thereof with a brush or a roller 805. Once applied, the liquid rubber composition is permitted to cure and non-slip regions 806 are formed by the cured compositions. The composition can be applied to selected regions 806 of the bottom surface 802 as is shown in FIG. 8 or alternatively the entire bottom surface 802, except for the drain 804 can be coated.

In another aspect, the composition is applied to the interior surfaces of a cardboard box, paper bag, or other moisture-permeable container to create a watertight container. This process includes coating the inside of a paper bag or cardboard container with the composition. Preferably all of the bottom surface of the bag or box is coated and at least a bottom portion of the wall is coated. The thickness of the composition applied to the side walls may be selected based on the configuration and desired use of the bag or box. This application step can be accomplished by a brush or roller or other desirable applicator. Alternatively, the liquid rubber can be poured into the bag or box and the bag or box can be rotated and/or tilted to coat its inner surfaces. After the composition has cured, the paper bag or cardboard container has become a waterproof, i.e., water impermeable, container. Thus, according to one expanded process of either of these methods, once the interior of a paper bag is coated or partially coated with the liquid rubber and the liquid rubber has cured, water can be deposited into the now-water impermeable bag or box, to demonstrate its water impermeability and the water may be poured from the bag or box. To further demonstrate this, at least one live fish can be deposited into the now-water impermeable bag or box with the water, and the water with the fish may be poured from the bag or box.

In one example (not illustrated), an airboat is assembled in which the bottom portion of the hull is formed using one or more wire mesh sections supported by a metal frame. The composition is applied onto the wire mesh using a paint roller. Additional coats of the composition may be applied successively, as needed, after allowing the previous coat to cure. The resulting hull is water-impermeable such that the airboat may be operated over prolonged periods of time without any water leaking into the interior of the boat.

In another example, the composition is poured into a pan, such as a rectangular non-stick baking pan, to a thickness of approximately ½ to one inch. After the composition is allowed to cure, the cured composition is removed from the pan. The resulting material may be easily handled and manipulated to demonstrate its flexibility.

In addition to the applications and benefits as set forth herein, there are benefits in these techniques as demonstrating the uses, the ease of the use, and the advantages of the viscous liquid rubber composition by each of these processes. By making articles waterproof, the techniques described herein further provide benefits associated with avoiding contact with moisture, including making articles rust-resistant, mold-resistant, mildew-resistant, and the like.

The foregoing description should be considered illustrative rather than limiting. It should be recognized that various modifications can be made without departing from the spirit or scope of the invention as described and claimed herein.

What is claimed:

1. A method of comparing the viscosity of a liquid rubber composition to that of a latex paint, the method comprising:

providing a horizontally oriented wire screen;

pouring the latex paint onto a first portion of the wire screen, whereby the latex paint drips through the first portion of the wire screen;

pouring the liquid rubber composition onto a second portion of the wire screen, whereby the liquid rubber composition does not drip through the second portion of the wire screen; and determining, based on observing that the latex paint drips through the first portion of the wire screen and that the liquid rubber composition does not drip through the second portion of the wire screen, that the liquid rubber composition has a higher viscosity than that of the latex paint.

* * * * *